US009627151B2

(12) United States Patent
Sengoku et al.

(10) Patent No.: US 9,627,151 B2
(45) Date of Patent: Apr. 18, 2017

(54) ELECTRICAL STORAGE MODULE (71) Applicants: Hitachi Automotive Systems, Ltd., Hitachinaka-shi, Ibaraki (JP); Nissan Motor Co., Ltd., Yokohama-shi, Kanagawa (JP)

(72) Inventors: Eisuke Sengoku, Hitachinaka (JP); Toshikazu Maeshima, Hitachinaka (JP); Hiroshi Hoshi, Hitachinaka (JP); Akira Kotaki, Hitachinaka (JP); Shigeyuki Kiyota, Yokohama (JP); Yoshiyuki Tanaka, Sagamihara (JP); Toyoki Iguchi, Yokohama (JP); Hiroaki Saitou, Machida (JP); Masayoshi Saeki, Tokyo (JP)

(73) Assignees: Hitachi Automotive Systems, Ltd., Hitachinaka-shi (JP); Nissan Motor Co., Ltd., Yokohama-shi (JP)

( * ) Notice: Subject to any disclaimer, the term of this patent is extended or adjusted under 35 U.S.C. 154(b) by 45 days.

(21) Appl. No.: 14/776,206

(22) PCT Filed: Feb. 4, 2014

(86) PCT No.: PCT/JP2014/052550
§ 371 (c)(1),
(2) Date: Sep. 14, 2015

(87) PCT Pub. No.: WO2014/141774
PCT Pub. Date: Sep. 18, 2014

(65) Prior Publication Data
US 2016/0035497 A1 Feb. 4, 2016

(30) Foreign Application Priority Data

Mar. 15, 2013 (JP) .................................. 2013-053737

(51) Int. Cl.
*H01M 2/10* (2006.01)
*H01M 10/48* (2006.01)
(Continued)

(52) U.S. Cl.
CPC ............... *H01G 11/10* (2013.01); *H01G 2/04* (2013.01); *H01G 11/82* (2013.01);
(Continued)

(58) Field of Classification Search
CPC .. H01M 2/1077; H01M 10/48; H01M 2/1055; H01M 2/204
See application file for complete search history.

(56) References Cited

U.S. PATENT DOCUMENTS

2006/0262482 A1 11/2006 Yamamoto et al.
2008/0068801 A1* 3/2008 Wilk ....................... H01G 2/04
361/702

(Continued)

FOREIGN PATENT DOCUMENTS

CN 1866584 A 11/2006
JP 2001-345082 A 12/2001
(Continued)

OTHER PUBLICATIONS

International Search Report (PCT/ISA/210) dated Mar. 18, 2014 with English translation (five pages).

*Primary Examiner* — Stewart Fraser
(74) *Attorney, Agent, or Firm* — Crowell & Moring LLP (57) ABSTRACT An electrical storage module in which a plurality of electricity storage elements are electrically connected by conductive member, includes: a voltage detection board having voltage detection conductor that detects terminal voltage of the electricity storage element; a first external threaded component that connects the voltage detection conductor of the voltage detection board to the conductive member; and a cover that covers the voltage detection board; wherein: the cover is made from an insulating material; the conductive member has a first internal threaded portion into which the first external threaded component is to be screwingly engaged; and the distance between the inside surface of the
(Continued)

cover that faces a head portion of the first external threaded component and an upper surface of the head portion of the first external threaded component is shorter than the distance between an end portion of the first internal threaded portion towards the cover side and an end of shaft portion of the first external threaded component.

3 Claims, 7 Drawing Sheets

(51) Int. Cl.
- *H01G 11/10* (2013.01)
- *H01G 2/04* (2006.01)
- *H01G 11/82* (2013.01)
- *H01M 2/20* (2006.01)
- *H01M 10/42* (2006.01)
- *H01M 10/0525* (2010.01)

(52) U.S. Cl.
CPC ....... *H01M 2/1055* (2013.01); *H01M 2/1077* (2013.01); *H01M 2/204* (2013.01); *H01M 2/206* (2013.01); *H01M 10/4257* (2013.01); *H01M 10/48* (2013.01); *H01M 10/0525* (2013.01); *H01M 2220/20* (2013.01); *Y02E 60/122* (2013.01); *Y02E 60/13* (2013.01); *Y02T 10/7022* (2013.01)

(56) References Cited

U.S. PATENT DOCUMENTS

| | | | |
|---|---|---|---|
| 2009/0155680 A1* | 6/2009 | Maguire | H01M 2/1077 429/158 |
| 2010/0073005 A1 | 3/2010 | Yano et al. | |
| 2010/0190050 A1* | 7/2010 | Ochi | H01M 2/24 429/160 |
| 2011/0008659 A1* | 1/2011 | Okada | H01M 2/1077 429/90 |

FOREIGN PATENT DOCUMENTS

| | | |
|---|---|---|
| JP | 2006-324060 A | 11/2006 |
| JP | 2010-80135 A | 4/2010 |
| JP | 2012-9389 A | 1/2012 |
| JP | 2012-74338 A | 4/2012 |
| JP | 2012-217276 A | 11/2012 |
| JP | 2013-235734 A | 11/2013 |

* cited by examiner

ELECTRICAL STORAGE MODULE

TECHNICAL FIELD

The present invention relates to an electrical storage module.

BACKGROUND ART

An electrical storage module that is mounted to an electrically operated vehicle or the like includes a plurality of electricity storage elements with, in each pair of adjacent electricity storage elements, the positive electrode side of one and the negative electrode side of the other being electrically connected by bus bars in series. With such an electrical storage module that includes a plurality of electricity storage elements, it is necessary to ascertain the states of the electricity storage elements in order to avoid excessive charging or discharging of the electricity storage elements. Due to this, a conductor for voltage detection is electrically connected to each of the electricity storage elements in order to detect its terminal voltage.

An electrical storage module in which such voltage detection conductors of a voltage detection board and bus bars are electrically connected together by being clamped and fixed with screws is described in Patent Document #1.

CITATION LIST

Patent Literature

Patent Document #1: Japanese Laid-Open Patent Publication 2012-74338.

SUMMARY OF INVENTION

Technical Problem

If the voltage detection conductors of the voltage detection board and the bus bars are connected together with screws, then there is a fear that the screws may gradually become loose and drop out due to vibration of the vehicle or the like, and that screws that have thus dropped out may make unusual noises.

Solution to Technical Problem

According to the 1st aspect of the present invention, an electrical storage module in which a plurality of electricity storage elements are electrically connected by conductive member comprises: a voltage detection board having voltage detection conductor that detects terminal voltage of the electricity storage element; a first external threaded component that connects the voltage detection conductor of the voltage detection board to the conductive member; and a cover that covers the voltage detection board; wherein: the cover is made from an insulating material; the conductive member has a first internal threaded portion into which the first external threaded component is to be screwingly engaged; and the distance between the inside surface of the cover that faces a head portion of the first external threaded component and an upper surface of the head portion of the first external threaded component is shorter than the distance between an end portion of the first internal threaded portion towards the cover side and an end of shaft portion of the first external threaded component.

Advantageous Effects of Invention

According to the present invention it is possible to prevent screws dropping out due to vibration, so that it is possible to prevent unusual noises being caused by screws that have dropped out.

DESCRIPTION OF EMBODIMENTS

In the following, with reference to the drawings, an embodiment will be explained in which the present invention is applied to an electrical storage module installed in an electrical storage device that may be mounted either to a hybrid type electric automobile driven by an engine or an electric motor or both, or to an electric automobile driven only by an electric motor.

Figure 1:
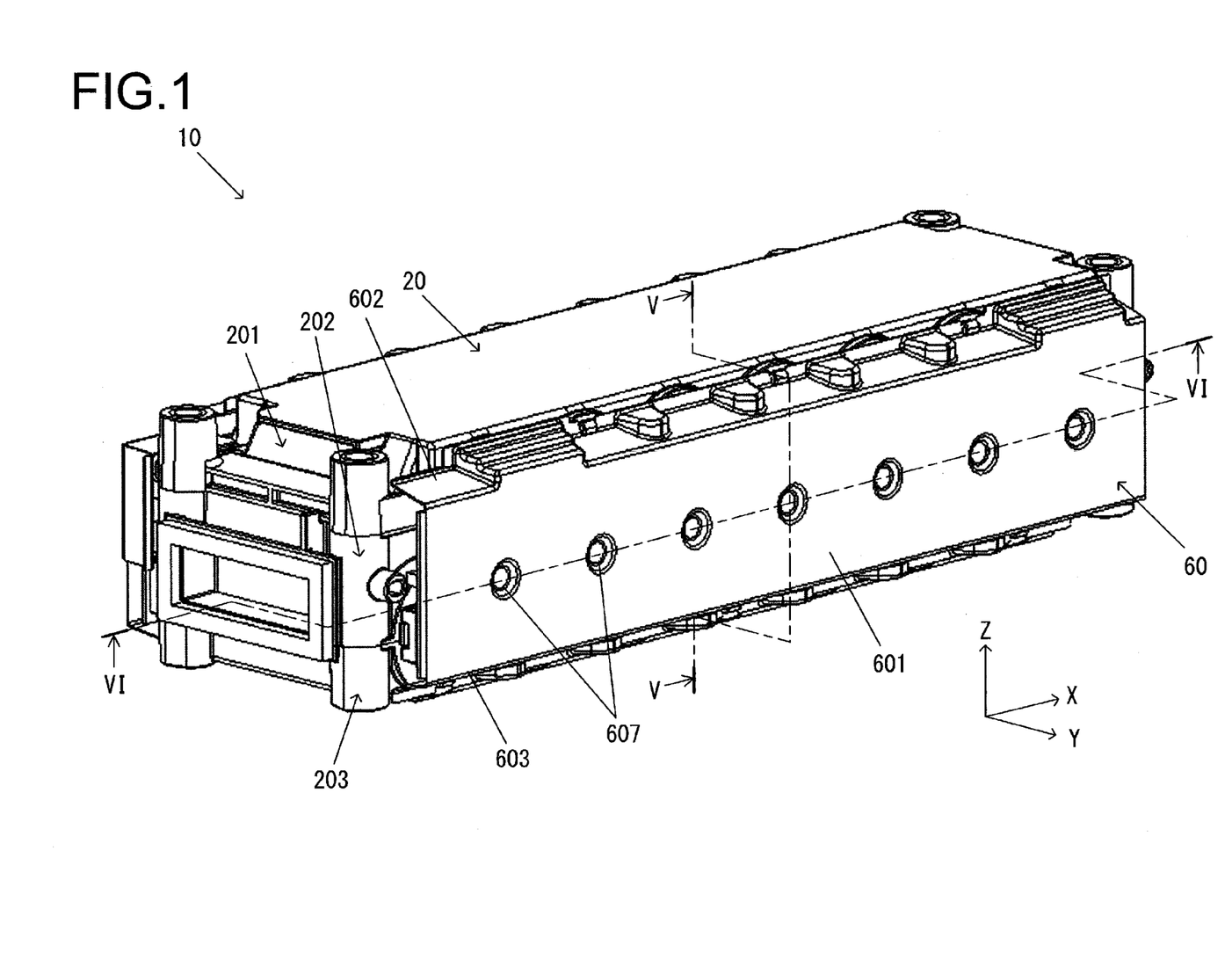
FIG. 1 is an external perspective view of an electrical storage module according to an embodiment of the present invention.
Figure 2:
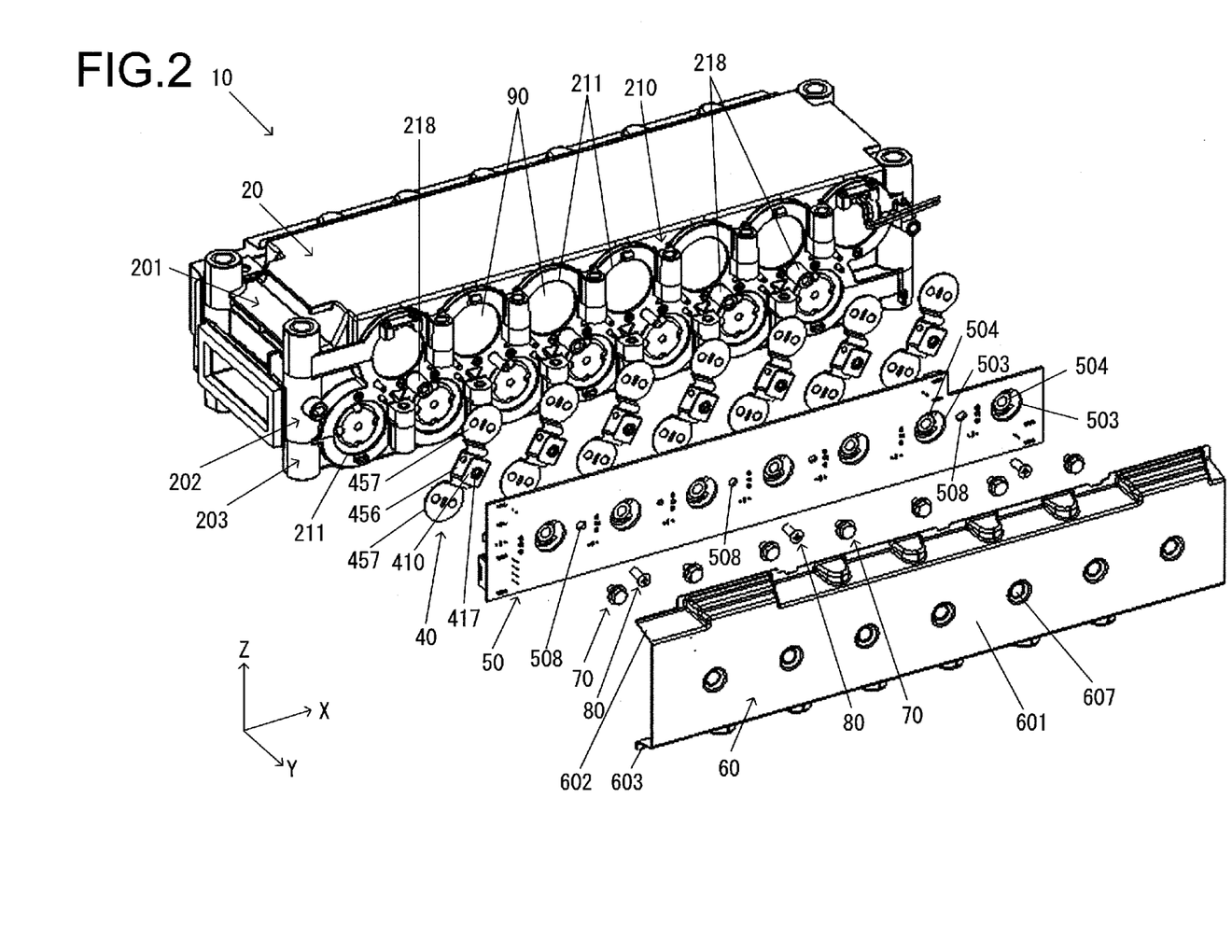
FIG. 2 is an exploded perspective view of the electrical storage module of FIG. 1.

FIG. 1 is an external perspective view of an electrical storage module 10 according to an embodiment of the present invention. And FIG. 2 is an exploded perspective view of the electrical storage module 10. As shown in FIG. 1, this electrical storage module 10 is formed in the shape of a rectangular parallelepiped; and as shown in FIG. 2, a plurality of electricity storage elements 90 are electrically connected together by a plurality of bus bars 40 in this electrical storage module 10. The electrical storage module 10 comprises the plurality of electricity storage elements 90, the plurality of bus bars 40, a casing 20 that houses the plurality of electricity storage elements 90, a voltage detection board 50, and a cover 60.

It should be understood that, in the following explanation, the longest dimension of the electrical storage module 10, in other words the longitudinal direction of the electrical storage module 10, is defined as being the X direction. And the direction of the central axes of the electricity storage elements 90, which are cylindrical, is defined as being the Y direction. Moreover, the shortest dimension of the electrical storage module 10, in other words the shortest direction of the electrical storage module 10, is defined as being the Z direction. This X direction, Y direction, and Z direction are mutually orthogonal.

Figure 3:
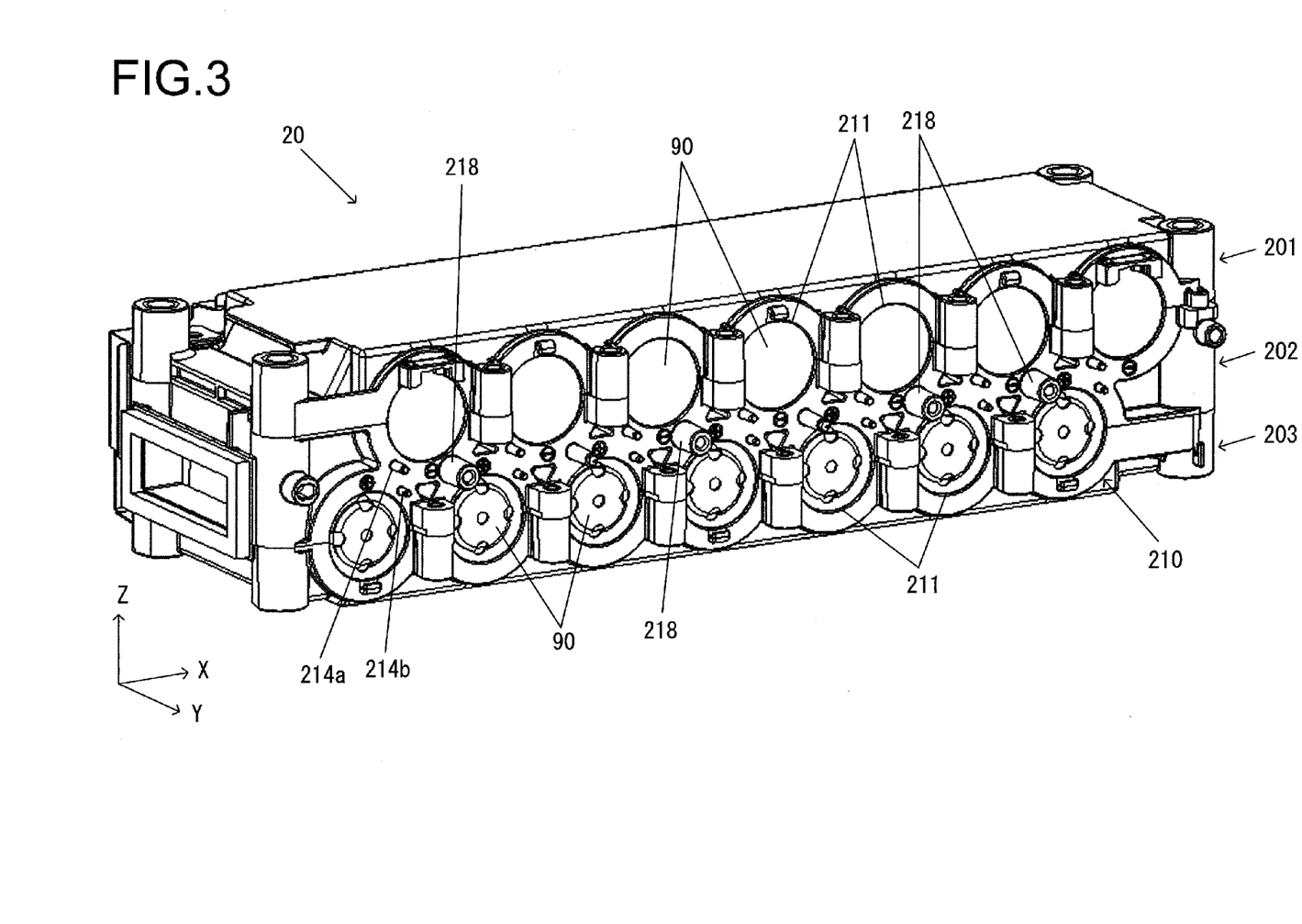
FIG. 3 is an external perspective view showing the electrical storage module, with a voltage detection board, a cover, and a plurality of bus bars disposed on one side thereof removed.

FIG. 2 gives an exploded view of the voltage detection board 50, the cover 60, the bus bars 40 and so on as seen from one side in the Y direction, with a voltage detection board, a cover, bus bars and so on the other side in the Y direction still installed. And FIG. 3 is an external perspective view showing the electrical storage module 10 with the voltage detection board 50, the cover 60, and the plurality of bus bars 40 that were disposed on that one side thereof removed. Since the structure of the voltage detection board 50, the cover 60, and the plurality of bus bars 40 and the like shown in FIG. 2 on one side of the electrical storage module 10 and the structure of the other voltage detection board, cover, and bus bars and the like not shown in the figures on the other side thereof are almost the same, only the structure on one side of the electrical storage module 10 will be explained, while explanation of the structure on the other side thereof will be omitted.

As shown in FIG. 2 and FIG. 3, the electricity storage elements 90 that are installed in this electrical storage module 10 are cylindrical lithium ion secondary cells, and these are arranged at regular intervals, with seven thereof in each of an upper layer (towards the upper part of the figure) and a lower layer (towards the lower part of the figure). The electricity storage elements 90 in the upper layer and the electricity storage elements 90 in the lower layer are stored in a state of being spaced mutually apart along the X direction by just half a pitch. The electricity storage elements 90 in the upper layer and the electricity storage elements 90 in the lower layer are arranged so that the orientation of the positive electrodes of the electricity storage element 90 in the upper layer is opposite to the orientation of the negative electrodes of the electricity storage elements 90 in the lower layer. The one ends in the Y direction of the electricity storage elements 90 in the upper layer are their negative terminals, while their other ends are their positive terminals. And the one ends in the Y direction of the electricity storage elements 90 in the lower layer are their positive terminals, while their other ends are their negative terminals.

The casing 20 includes three members that are made from an insulating resin such as PBT (polybutylene terephthalate) or the like: a lower housing member 203, an intermediate housing member 202, and an upper housing member 201. The electricity storage elements 90 on the lower layer are clamped between and contained by the lower housing member 203 and the intermediate housing member 202, while the electricity storage elements 90 on the upper layer are clamped between and contained by the intermediate housing member 202 and the upper housing member 201.

When the lower housing member 203, the intermediate housing member 202, and the upper housing member 201 are coupled together, opening windows 211 are defined in each of two side plates 210 at the two sides of the casing 20 in the Y direction to expose the end surfaces of the electricity storage elements 90 at both sides in the Y direction (however, only the side plate 210 in one Y direction is shown in FIGS. 2 and 3).

As shown in FIG. 2, the bus bars 40 are electrically conductive plate members that are made from metal, for example from copper or the like, and that electrically connect together adjacent ones of the electricity storage elements 90 in the upper layer and the electricity storage elements 90 in the lower layer. The bus bar 40 has central portion 456 shaped in rectangular flat plate, end portions 457 positioned at both ends of the central portion 456, and connection terminal 410 that extends from the central portion 456.

Figure 4:
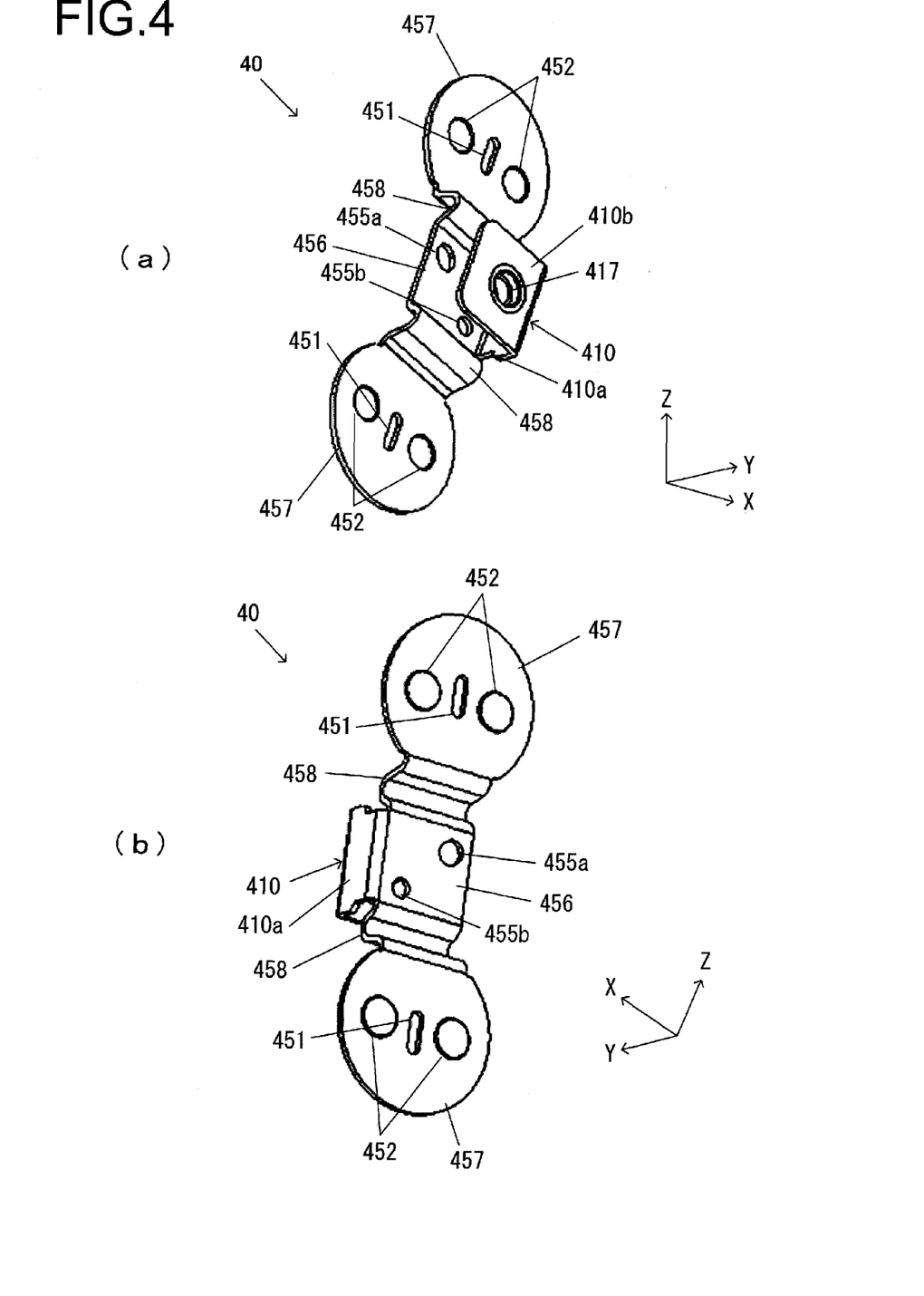
FIGS. 4(a) and 4(b) are external perspective views of one of the bus bars.

FIG. 4(a) is an external perspective view of one of the bus bars 40 of FIG. 2, while FIG. 4(b) is an external perspective view of this bus bar 40 of FIG. 4(a) as seen from its opposite side. As shown in FIG. 4, each of the end portions 457 of the bus bar 40 is connected to the central portion 456 thereof by a link portion 458. The cross section of each of these link portions 458 is formed in the shape of a letter U, and they are elastically deformable.

One slot 451 is formed in each end portion 457 of each of the bus bars 40. Moreover, two junction portions 452 are formed on each end portion 457 of each of the bus bars 40 for connection to the surface of a terminal of one of the electricity storage elements 90. The slots 451 are provided in order to regulate the flow of current during welding of the end portions 457 of the bus bars 40 to the surfaces of the terminals of the electricity storage elements 90. And through holes 455a and 455b are formed in the central portion 456 of each of the bus bars 40, with guide pins 214a and 214b that are provided on the side plate 210 (refer to FIG. 3) to be inserted into these through holes.

Figure 5:
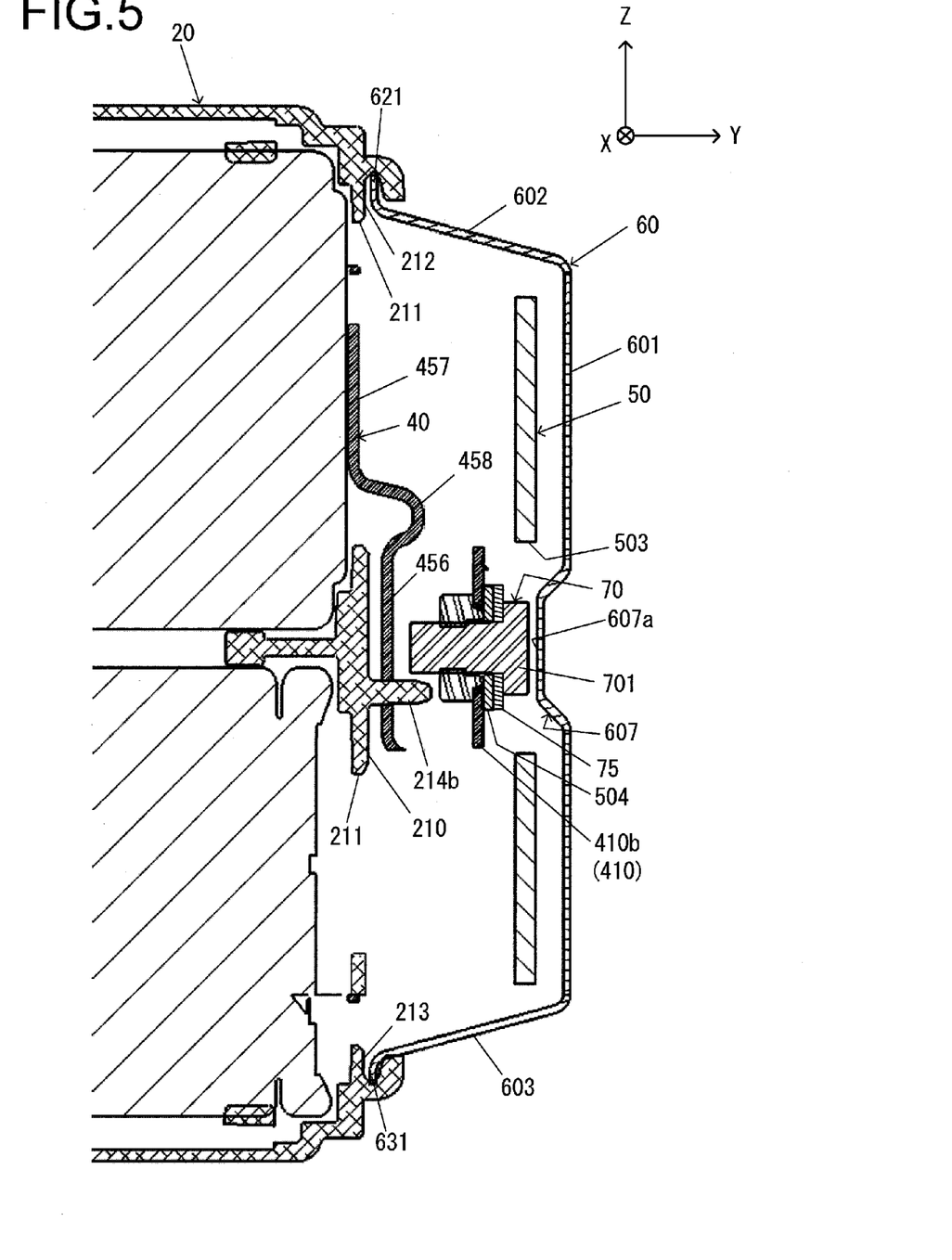
FIG. 5 is a schematic cross sectional figure taken along lines V V in FIG. 1.

FIG. 5 is a schematic cross sectional figure taken along lines V V in FIG. 1. One of the bus bars 40 is shown as installed to the side plate 210 so that the through holes 455a and 455b formed in its central portion 456 respectively fit over the guide pins 214a and 214b of the side plate 210 (refer to FIG. 3). When the bus bar 40 is thus installed to the side plate 210, the two end portions 457 of the bus bar 40 (only one of these end portions 457 is visible in FIG. 5) are presented against the corresponding opening windows 211, and are contacted against the terminal surfaces of the corresponding electricity storage elements 90 (one against a positive terminal surface and one against a negative terminal surface). The end portions 457 of the bus bar 40 and the terminal surfaces of the electricity storage elements 90 may, for example, be joined together by positioning a welding torch (not shown in the figures) against the junction portions 452 and by arc welding the junction portions 452 and the electricity storage elements 90 together.

As shown in FIGS. 4(a) and 4(b), a connection terminal 410 is provided at the central portion 456 of each of the bus bars 40. And, as shown in FIG. 2 and FIGS. 4(a) and 4(b), the bus bars 40 are disposed so that their central portions 456 are parallel to the X Z plane. As shown in FIGS. 4(a) and 4(b), each of the connection terminals 410 comprises a link plate 410a that is bent through 90° toward the +Y direction from one side of the central portion 456, and a terminal plate 410b that is bent through 90° from the end portion in the +Y direction of the link plate 410a and that is provided to oppose the central portion 456.

Figure 6:
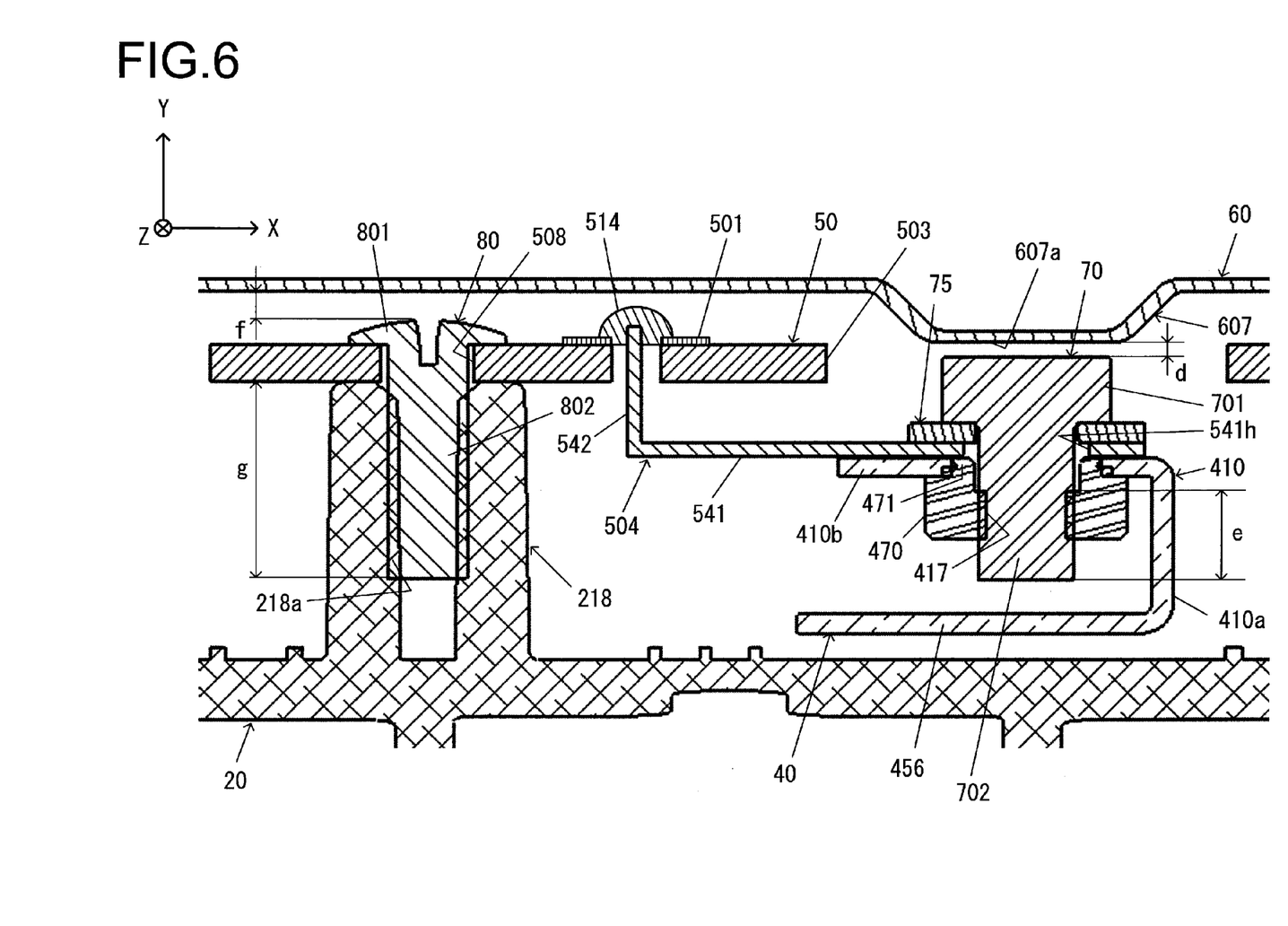
FIG. 6 is a schematic cross sectional figure taken along lines VI VI in FIG. 1.

FIG. 6 is a schematic cross sectional figure taken along lines VI VI in FIG. 1. As shown in FIG. 6, a back nut 470 is provided on the surface of the terminal plate 410b that faces toward the central portion 456. An opening portion formed in a circular shape is provided in the center of the terminal plate 410b, and a base portion 471 of the back nut 470 is fixed to this opening portion by swaging. A through hole is provided in the back nut 470, and passes through the back nut 470 toward the electricity storage element 90 from the end portion of the back nut facing toward the cover 60. In this through hole, a non-internal threaded portion is formed for a predetermined distance from its end portion on the side of the cover 60, and an internal threaded portion (i.e. an effective threaded portion) 417 is formed from the end portion of the non-internal threaded portion to the end portion of the through hole on the side of the electricity storage element 90.

As shown in FIG. 2, the voltage detection board 50 is formed in an almost rectangular shape, and is disposed so as to be parallel to the X Z plane. This voltage detection board 50 comprises a voltage detection circuit (not shown in the figures) that detects the terminal voltages of the electricity storage elements 90. A connector or the like (not shown in the figures) for connection of a voltage detection line (also not shown in the figures) is provided on one end portion of the voltage detection board 50, and the voltage detection circuit (not shown in the figures) of the voltage detection board 50 is connected to a control device (also not shown in the figures) by this voltage detection line (not shown in the figures). After the bus bars 40 have been fitted, the voltage detection board 50 is attached to the side plate 210 of the casing 20.

Upon the central portion in Z direction of the side plate 210, a plurality of bosses 218 are provided and arranged in a line along the X direction. As shown in FIG. 6, each of these bosses 218 projects in the +Y direction, and has an internal threaded portion 218*a* into which a set screw 80 is to be screwingly engaged. This internal threaded portion 218*a* (i.e. its effective threaded portion) extends for a predetermined distance from the end surface of the boss 218, and beveling is performed upon this end surface. The voltage detection board 50 is fixed to the casing 20 by the set screws 80 being screwingly engaged into these internal threaded portions 218*a* provided in the bosses 218 of the side plate 210 of the casing 20.

As shown in FIGS. 2, 5, and 6, opening portions 503 are formed through the voltage detection board 50, each of these having a circular shape and being located at a site that opposes a corresponding one of the connection terminals 410 of the bus bars 40 in the state in which the board 50 is fixed to the side plate 210. Voltage detection terminals 504 that are electrically connected to the connection terminals 410 are provided in these opening portions 503. As shown in FIGS. 5 and 6, the connection terminals 410 and the voltage detection terminals 504 are connected together by bolts 70.

As shown in FIG. 6, the voltage detection terminal 504 comprises a flat plate portion 541 that is contacted against the terminal plate 410*b* of the connection terminal 410, and a bent portion 542 that is bent around in the +Y direction through 90° from the end portion in the −X direction of the flat plate portion 541, in other words toward the voltage detection board 50 The cross section of this flat plate portion 541 and this bent portion 542 is shaped as a letter L.

A through hole (hereinafter termed the "bolt hole 541*h*") is provided in the flat plate portion 541, and a shaft portion 702 of the bolt 70 passes through this bolt hole 541*h*. As schematically shown in FIG. 6, the end portion of the bent portion 542 passes through a through hole in the voltage detection board 50, and is joined by solder 514 to a voltage detection circuit 501 that is provided upon the voltage detection board 50.

Through holes (hereinafter termed the "screw holes 508") are provided in the voltage detection board 50 through which the shaft portions 802 of the set screws 80 are passed. In the state in which the voltage detection board 50 is contacted against the end surfaces of the bosses 218, the shaft portions 802 of the set screws 80 are passed through the screw holes 508, and external threaded portions provided upon the shaft portions of the set screws 80 are screwed into and engaged with the internal threaded portions 218*a* of the bosses 218. It should be understood that these external threaded portions of the shaft portions 802 extend for a predetermined distance from their screw tips, and their effective screw length is set to be longer than that of the internal threaded portions 218*a*.

When the set screws 80 are tightened up by a predetermined amount, the voltage detection board 50 is clamped between the seating surfaces of the head portions 801 of the set screws 80 and the end surfaces of the bosses 218, so that the voltage detection board 50 is fixed to the casing 20.

When the voltage detection board 50 is thus fixed with the set screws 80, the flat plate portions 541 of the voltage detection terminals 504 are contacted against the terminal plates 410*b* of the bus bars 40. Then the shaft portions of the bolts 70 are passed through the bolt holes 541*h* of the voltage detection terminals 504, and external threaded portions that are provided upon the shaft portions 702 of the bolts 70 are screwed into and engaged with the internal threaded portions 417 of the back nuts 470. It should be understood that the external threaded portions of the shaft portions 702 extend for a predetermined distance from their screw heads, and their effective screw lengths are set to be longer than those of the internal threaded portions 417.

Washers 75 are disposed between the seating surfaces of the head portions 701 of the bolts 70 and the flat plate portions 541 of the voltage detection terminals 504. When the bolts 70 are tightened up by a predetermined amount, the flat plate portions 541 of the voltage detection terminals 504 and the washers 75 are clamped by the seating surfaces of the head portions 701 of the bolts 70 and the terminal plates 410*b* of the bus bars 40, so that the connection terminals 410 of the bus bars 40 and the voltage detection terminals 504 are electrically connected together. Due to this, the bus bars 40 and the voltage detection circuit 501 of the voltage detection board 50 are electrically connected together via the voltage detection terminals 504.

As shown in FIGS. 1 and 2, the cover 60 is made from a material that has the property of being insulating, such as PVC (polyvinyl chloride) or the like, and is adapted to cover over the entire side plate 210 and voltage detection board 50. The cover 60 comprises a side cover portion 601 that is almost rectangular in shape, an upper cover portion 602 that extends from the edge portion in the +Z direction of the side cover portion 601 to the casing 20, and a lower cover portion 603 that extends from the edge portion in the −Z direction of the side cover portion 601 to the casing 20.

As shown in FIG. 5, an attachment portion 621 that is bent around into the +Z direction (upward in the figure) is provided at the edge of the upper cover portion 602. Similarly, an attachment portion 631 that is bent around into the −Z direction (downward in the figure) is provided at the edge of the lower cover portion 603.

Grooves 212 that open in the −Z direction are provided at the edge portion of the casing 20 in the +Z direction. These grooves 212 extend for predetermined distances along the X direction, and are provided at a plurality of spots upon the casing 20. In a similar manner, grooves 213 that open in the +Z direction are provided at the edge portion of the casing 20 in the −Z direction. These grooves 213 extend for predetermined distances along the X direction, and are provided at a plurality of spots upon the casing 20.

When the upper cover portion 602 is pressed toward the −Z direction (downward in the figure) and the lower cover portion 603 is pressed toward the +Z direction, the cover 60 can be elastically deformed so that the distance between the upper cover portion 602 and the lower cover portion 603 becomes smaller. Due to this, by applying pressure from the exterior of the cover 60 so as to elastically deform the cover 60 so that the distance between the attachment portion 621 of the cover 60 and the attachment portion 631 thereof becomes smaller, the operator is able to take out the attachment portions 621 and 631 from the grooves 212 and 213. And, when fitting the cover 60 to the casing 20, after having applied pressure from the exterior of the cover 60 so as to elastically deform the cover 60 so that the attachment portions 621 and 631 are positioned to oppose the grooves 212 and 213 respectively, the operator can set the attachment portions 621 and 631 into the grooves 212 and 213 respectively by releasing the pressure that he is applying from the exterior.

When the cover 60 is thus attached to the casing 20, a space is defined between the cover 60 and the side plate 210.

As shown in FIGS. 5 and 6, convex portions 607 that project towards the bolts 70 are provided at positions on the cover 60 that oppose the head portions 701 of the bolts 70. As seen from the inside of the cover 60, the external shapes of these convex portions 607 are formed as conical frustrums, and their end surfaces 607a are made as flat surfaces that are circular in shape. The internal surface of the cover 60 is configured so that these end surfaces 607a oppose the head portions of the bolts 70.

The positional relationships of the bolts 70 and the cover 60, and the positional relationships of the set screws 80 and the cover 60, in the state in which the components are all assembled together, will now be explained. As shown in FIG. 6, the distance d between the end surface 607a of the convex portion 607 and the upper surface of the head portion 701 of the bolt 70 is shorter than the distance e between the end portion of the internal threaded portion 417 toward the side of the cover 60 and the end of the shaft portion 702 of the bolt 70 (in other words, the screw tip). It should be understood that the distance d and the distance e are set while taking into account the manufacturing tolerances and the assembly tolerances for the various components, so that, even when the distance d is the longest possible and the distance e is the shortest possible, they still satisfy the relationship "d<e". In this embodiment, the distance d is around one sixth of the distance e. Due to this, even if one of the bolts 70 should gradually become loose due to vibration or shock or the like, and even if that bolt 70 should shift in the axial direction (i.e. in the +Y direction), the maximum possible value for this shift amount is d, because the upper surface of the head portion 701 of that bolt 70 will come into contact against the end surface 607a of the corresponding convex portion 607.

Similarly, the distance f between the inside surface of the cover 60 where it opposes the head portion 801 of the set screw 80 and the upper surface of the head portion 801 of the set screw 80 is shorter than the distance g between the end portion of the internal threaded portion 218a toward the side of the cover 60 and the end of the shaft portion 802 of the set screw 80 (in other words, the screw tip). It should be understood that the distance f and the distance g are set while taking into account the manufacturing tolerances and the assembly tolerances for the various components, so that, even when the distance f is the longest possible and the distance g is the shortest possible, they still satisfy the relationship "f<g". In this embodiment, the distance f is around one eighth of the distance g. Due to this, even if one of the set screws 80 should gradually become loose due to vibration or shock or the like, and even if that set screw 80 should shift in the axial direction (i.e. in the +Y direction), the maximum possible value for this shift amount is f, because the upper surface of the head portion 801 of that set screw 80 will come into contact against the inside surface of the cover 60.

According to the embodiment described above, the following beneficial operational effects may be obtained.

(1) The distance d between the inside surface of the cover 60 where it opposes the head portion 701 of the bolt 70 and the upper surface of the head portion 701 of the bolt 70 is set to be shorter than the distance e between the end portion of the internal threaded portion 417 toward the side of the cover 60 and the end of the shaft portion 702 of the bolt 70. Due to this, the engagement between the external threaded portion formed upon the shaft portion 702 of the bolt 70 and the internal threaded portion 417 is prevented from coming apart. In other words, according to this embodiment, it is possible to prevent the bolts 70 from dropping out, and therefore it is possible to prevent the generation of strange noises due to one or more of the bolts 70 dropping out.

Figure 7:
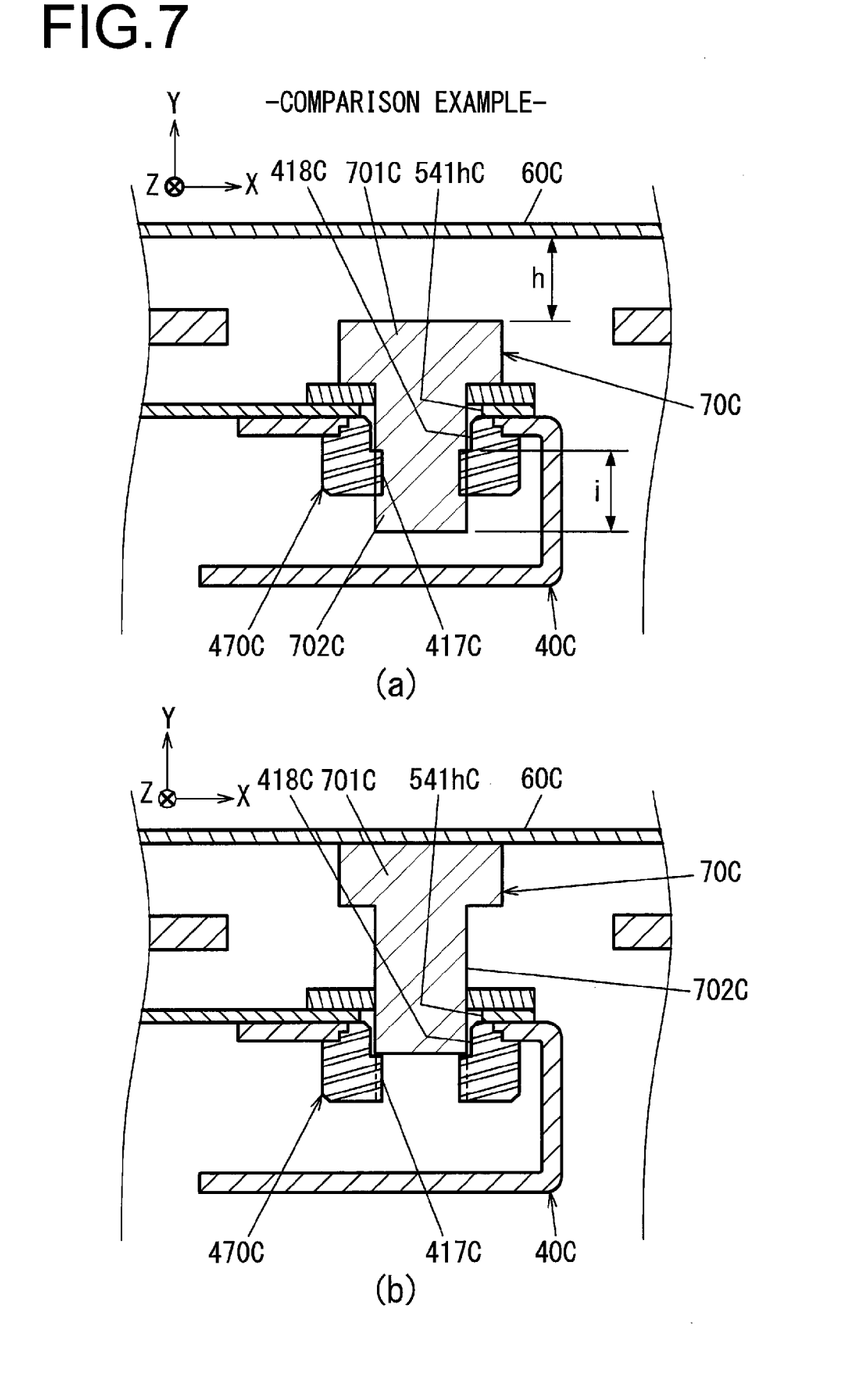
FIGS. 7(a) and 7(b) are figures showing an example of a structure for comparison with the structure of FIG. 6, and show a connection portion between a voltage detection terminal and a bus bar in enlarged view.

FIGS. 7(a) and 7(b) are figures showing an example of a structure for comparison with the structure of FIG. 6. As shown in FIG. 7(a), in this comparison example, the distance h between the upper surface of the head portion 701C of the bolt 70C and the inside surface of the cover 60C is slightly longer, as compared to the distance i between the end portion of the internal threaded portion 417C on the side toward the cover 60C and the end of the shaft portion 702C of the bolt 70C. Due to this if, as shown in FIG. 7(b), the engagement between the external threaded portion formed upon the shaft portion 702C of the bolt 70C and the internal threaded portion 417C is separated, then strange loud noises will occur caused by vibration of the vehicle, due to contact between the bolt 70 that has come out and surrounding components. It should be understood that a non-threaded portion 418C is formed on the back nut 470C between its end portion on the side of the cover 60C and the end portion of the internal threaded portion 417C on the side of the cover 60C, so that, even if the engagement between the external threaded portion of the bolt 70C and the internal threaded portion 417C of the back nut 470C is separated, the bolt 70C will not come completely out from the bolt hole 541hC of the bus bar 40C.

By contrast, with this embodiment, since the engagement between the external threaded portion of the bolt 70 and the internal threaded portion 417 of the back nut 470 is prevented from becoming disengaged, accordingly the generation of strange noises due to one or more of the bolts 70 dropping out can be prevented.

(2) The convex portions 607 that project towards the bolts 70 are formed at positions upon the cover 60 that oppose the head portions 701 of the bolts 70. Due to the provision of these convex portions 607, it becomes unnecessary for the entire inside surface of the side cover portion 601 of the cover 60 to approach the casing 20 closely. Due to this, for example, there is no interference between the head portions 801 of the screws 80 and the inside surface of the cover 60, so that the cover 60 is not pressed outward by the head portions 801, and thus the cover 60 is not deformed.

(3) The distance f between the inside surface of the cover 60 where it opposes the head portions 801 of the set screws 80 and the upper surfaces of the head portions 801 of the set screws 80 is set to be shorter than the distance g between the end portions of the internal threaded portions 218a toward the side of the cover 60 and the ends of the shaft portions 802 of the set screws 80. Due to this, separation of the engagement of the external threaded portion of the shaft portion of any one of the bolts 80 with the internal threaded portion 218a of the corresponding one of the bosses 218 is prevented.

It should be understood that the following variations are also to be considered as being within the range of the present invention, and that one or a plurality of these variant embodiments may also be combined with the embodiment described above.

Variant Embodiments (1) While, in the embodiment described above, the distance d was around one sixth of the distance e, the present invention should not be considered as being limited by this detail. It will be sufficient if the distance d is at least shorter than the distance e.

(2) While, in the embodiment described above, the distance f was around one eighth of the distance g, the present invention should not be considered as being limited by this detail. It will be sufficient if the distance f is at least shorter than the distance g.

(3) It would also be acceptable to make the distance d zero. In other words, it would be possible to make the inside surface of the cover 60 where it opposes the head portions 701 of the bolts 70 and the upper surfaces of the head portions 701 of the bolts 70 contact against one another. Due to this, it would be possible to prevent the generation of strange noises due to one of the bolts 70 becoming loose.

(4) It would also be acceptable to make the distance f zero. In other words, it would be possible to make the inside surface of the cover 60 where it opposes the head portions 801 of the set screws 80 and the upper surfaces of the head portions 801 of the set screws 80 contact against one another. Due to this, it would be possible to prevent the generation of strange noises due to one of the set screws 80 becoming loose.

(5) While, in the embodiment described above, it was arranged for the distance f between the inside surface of the cover 60 where it opposes the head portions 801 of the set screws 80 and the upper surfaces of the head portions 801 of the set screws 80 to be shorter than the distance g between the end portion of the internal threaded portion 218a of the bosse 218 toward the side of the cover 60 and the end of the shaft portion 802 of the set screw 80, the present invention is not to be considered as being limited by this detail. It would also be possible to make the distance f be longer than the distance g, if coming loose of the set screws 80 is prevented by fixing together the external threaded portions that are formed upon the shaft portions 802 of the set screws 80 and the internal threaded portions 218a of the bosses 218 with adhesive.

(6) While the casing 20 was made by coupling together three members, i.e. the lower housing member 203, the intermediate housing member 202, and the upper housing member 201, this is not to be considered as being limitative of the present invention.

(7) The shapes of the bolts 70 and the set screws 80 are not limited by the embodiment described above. Threaded components of various types may be employed, provided that they have head portions and shank portions.

(8) While, in the embodiment described above, an example was explained in which the voltage detection terminals 504 connected to the voltage detection circuit 501 of the voltage detection board 50 and formed in the shape of a letter L in cross section were connected to the connection terminals 410 of the bus bars 40 by the bolts 70, this is not to be considered as being limitative of the present invention. For example, it would also be acceptable to arrange to provide voltage detection terminals by voltage detection conductors that are formed upon the voltage detection board and that are electrically connected to the connection terminals 410 of the bus bars 40.

(9) While, in the embodiment described above, an example was explained in which the convex portions 607 projecting toward the bolts 70 were provided in positions upon the cover 60 that oppose the head portions 701 of the bolts 70, this is not to be considered as being limitative of the present invention. It would be possible to omit the convex portion 607, provided that it is possible to set the distance d between the inside surface of the cover 60 where it opposes the head portion 701 of the bolt 70 and the upper surface of the head portion 701 of the bolt 70 to be shorter than the distance e between the end portion of the internal threaded portion 417 toward the side of the cover 60 and the end of the shaft portion 702 of the bolt 70. Moreover, it would also be acceptable to arrange to provide convex portions upon the cover 60 projecting toward the set screws 80 in positions that oppose the head portions 801 of the set screws 80.

(10) While, in the embodiment described above, an example has been explained in which the internal threaded portions 218a are formed upon the bosses 218 in advance, and the set screws 80 are screwed into and engaged to these internal threaded portions 218a, the present invention is not to be considered as being limited to this structure. It would also be acceptable not to form the internal threaded portions 218a in the bosses 218 in advance, but rather to arrange to form the internal threaded portions 218a in bosses 218 that are made from resin and are shaped as cylinders, by screwing the set screws 80 into openings at the ends of these bosses 218.

(11) The material for the cover 60 is not limited to being PVC. Moreover, the material for the casing 20 is not limited to being PBT. The cover 60 and the casing 20 may be made from various materials that have the property of being insulating.

(12) While, in the embodiment described above, an electrical storage module 10 that was provided with a plurality of cylindrical electricity storage elements 90 was explained, the shape of the electricity storage elements 90 is not limited to being cylindrical. For example, it would also be acceptable to arrange to apply the present invention to an electrical storage module that is equipped with a plurality of square shaped electricity storage elements.

(13) While lithium ion secondary cells have been explained as one example of the electricity storage elements, it would also be possible to apply the present invention to secondary cells of other types, such as nickel-hydrogen cells or the like. Furthermore, it would also be possible to apply the present invention to an electrical storage module in which electric double layer capacitors or lithium ion capacitors are employed as the electricity storage elements.

(14) While, in the embodiment described above, an example was explained in which the present invention was applied to an electric automobile, the present invention is not to be considered as being limited to such an application. The present invention could also be applied to an electrical storage module that is installed in an electrical storage device that is part of a power supply device for some other type of electrically powered vehicle, such as, for example, a railroad vehicle such as a hybrid train or the like, a bus or the like, a goods vehicle such as a truck or the like, or a vehicle for industrial use such as a battery type fork lift truck or the like.

The present invention is not to be considered as being limited to the embodiment described above; changes and/or improvements may be made freely to the present invention, provided that its gist is preserved.

The contents of the disclosure of the following application, upon which priority is claimed, are hereby incorporated herein by reference:

Japanese Patent Application 2013-53737 (filed on Mar. 15, 2013).

REFERENCE SIGNS LIST

10: electrical storage module; 20: case; 40: bus bar; 50: voltage detection board; 60: cover; 70: bolt; 75: washer; 80:

bolt; 90: electricity storage element; 201: upper housing member; 202: intermediate housing member; 203: lower housing member; 210: side plate; 211: opening window; 212: groove; 213: groove; 214*a*; 214*b*: guide pins; 218: boss; 218*a*: internal threaded portion; 410: connection terminal; 410*a*: link plate; 410*b*: terminal plate; 417: internal threaded portion; 451: slot; 452: junction portion; 455*a*: through hole; 456: central portion; 457: end portion; 458: link portion; 470: back nut; 471: base portion; 501: voltage detection circuit; 503: opening portion; 504: voltage detection terminal; 508: screw hole; 541: flat plate portion; 541*h*: bolt hole; 542: bent portion; 601: side cover portion; 602: upper cover portion; 603: lower cover portion; 607: convex portion; 607*a*: end surface; 621: attachment portion; 631: attachment portion; 701: head portion; 702: shank portion; 801: head portion; 802: shank portion.

The invention claimed is:

1. An electrical storage module in which a plurality of electricity storage elements are electrically connected by a conductive member, comprising:
    a voltage detection board having a voltage detection conductor that detects terminal voltage of the electricity storage elements;
    a first external threaded component that connects the voltage detection conductor of the voltage detection board to the conductive member; and
    a cover that covers the voltage detection board;
    wherein:
    the cover is made from an insulating material;
    the conductive member has a first internal threaded portion into which the first external threaded component is to be screwingly engaged; and
    the distance between the inside surface of the cover that faces a head portion of the first external threaded component and an upper surface of the head portion of the first external threaded component is shorter than the distance between an end portion of the first internal threaded portion towards the cover side and an end of shaft portion of the first external threaded component.

2. An electrical storage module according to claim 1, wherein
    a convex portion is provided upon the cover at a position that opposes the head portion of the first external threaded component, projecting towards the first external threaded component.

3. An electrical storage module according to claim 1, further comprising:
    a housing member that houses the plurality of electricity storage elements; and
    a second external threaded component that attaches the voltage detection board to the housing member; and
    wherein:
    the housing member is made from an insulating material, and has a second internal threaded portion into which the second external threaded component is to be screwingly engaged; and
    the distance between an inside surface of the cover that faces a head portion of the second external threaded component and an upper surface of the head portion of the second external threaded component is shorter than the distance between an end portion of the second internal threaded portion towards the cover side and an end of shaft portion of the second external threaded component.

* * * * *